(12) United States Patent  
Yumiki et al.

(10) Patent No.: US 7,826,731 B2
(45) Date of Patent: Nov. 2, 2010

(54) CAMERA SYSTEM

(75) Inventors: Naoto Yumiki, Osaka (JP); Kenichi Honjo, Osaka (JP)

(73) Assignee: Panasonic Corporation, Osaka (JP)

( * ) Notice: Subject to any disclaimer, the term of this patent is extended or adjusted under 35 U.S.C. 154(b) by 199 days.

(21) Appl. No.: 12/092,886

(22) PCT Filed: Nov. 9, 2006

(86) PCT No.: PCT/JP2006/322374

§ 371 (c)(1), (2), (4) Date: May 7, 2008

(87) PCT Pub. No.: WO2007/055280

PCT Pub. Date: May 18, 2007

(65) Prior Publication Data

US 2009/0097832 A1  Apr. 16, 2009

(30) Foreign Application Priority Data

Nov. 11, 2005  (JP) .............................. 2005-327775

(51) Int. Cl.
  *G03B 17/00* (2006.01)
  *H04N 5/228* (2006.01)
(52) U.S. Cl. .................................... 396/55; 348/208.99
(58) Field of Classification Search .................. 396/55; 348/208.99, 208.4, 208.12, 208.16
See application file for complete search history.

(56) References Cited

U.S. PATENT DOCUMENTS

| 5,771,405 | A * | 6/1998 | Hirano ......................... 396/55 |
| 7,071,973 | B1 * | 7/2006 | Yoshioka et al. ......... 348/219.1 |
| 2002/0027599 | A1 | 3/2002 | Yamazaki |
| 2003/0044174 | A1 | 3/2003 | Endo |
| 2005/0052538 | A1 | 3/2005 | Sato et al. |

FOREIGN PATENT DOCUMENTS

| JP | 7-301837 | 11/1995 |
| JP | 11-282037 | 10/1999 |

(Continued)

OTHER PUBLICATIONS

Japanese Office Action issued in Japanese Patent Application No. 2007-544179, dated Aug. 4, 2009.

(Continued)

*Primary Examiner*—Rodney E Fuller
(74) *Attorney, Agent, or Firm*—McDermott Will & Emery LLP

(57) ABSTRACT

A camera system (1) includes a camera body (1), and an interchangeable lens (2) that is detachably mounted to the camera body (1). The camera system (1) includes an imaging sensor (11), an imaging optical system (L), a viewfinder optical system (19), a liquid crystal monitor (16), a quick return mirror (4), a shaking detection unit (21), an image blur correction unit (47), a sequence microcomputer (12), and a lens microcomputer (20). The image blur correction unit (47) corrects the blurring of an image that occurs due to the movement of the camera system (1), depending on the movement that is detected by the shaking detection unit (21). The lens microcomputer (20) makes the image blur correction unit (47) perform a correction operation in the case of a monitor photographing mode.

6 Claims, 16 Drawing Sheets

FOREIGN PATENT DOCUMENTS

| | | |
|---|---|---|
| JP | 2000-333064 | 11/2000 |
| JP | 2001-125173 | 5/2001 |
| JP | 2002-303909 | 10/2002 |
| JP | 2002-311470 | 10/2002 |
| JP | 2003-075879 | 3/2003 |
| JP | 2003-222922 | 8/2003 |
| JP | 2004-159051 | 6/2004 |
| JP | 2005-086669 A | 3/2005 |
| JP | 2005-128092 | 5/2005 |
| JP | 2005-175897 | 6/2005 |

OTHER PUBLICATIONS

Japanese Notice of Reasons for Rejection issued in Japanese Patent Application No. JP 2007-544179 dated Dec. 8, 2009.

Chinese Office Action, with English Translation, issued in Chinese Patent Application No. CN 200680039377.1, dated Mar. 6, 2009.

\* cited by examiner

CAMERA SYSTEM

RELATED APPLICATIONS

This application is the U.S. National Phase under 35 U.S.C. §371 of International Application No. PCT/JP2006/322374, filed on Nov. 9, 2006, which in turn claims the benefit of Japanese Application No. 2005-327775, filed on Nov. 11, 2005, the disclosures of which Applications are incorporated by reference herein.

TECHNICAL FIELD

The present invention relates to a camera system, and in particular, a single-lens reflex digital camera.

BACKGROUND ART

Single-lens reflex digital cameras which can convert the optical image of a subject into an electrical image signal and output the signal have been rapidly growing in popularity in recent years. With this single-lens reflex digital camera, the optical path is changed by reflecting the light incident (the image of the subject in other words) on a photographic lens using a reflecting mirror that is arranged on the photographic optical path behind the lens, and the erect image through a pentaprism and the like is guided to the optical viewfinder. As a result, the image of the subject passed through the lenses can be seen from the optical viewfinder, when the user observes a subject using the viewfinder. Therefore, normally, the position that the viewfinder optical path is formed is the fixed position of the reflecting mirror.

Meanwhile, in the case that the lenses are used for photographing, the reflecting mirror quickly changes the position thereof to retract from the photographic optical path, and by doing so, the viewfinder optical path is switched to the photographic optical path, and it will quickly return to the fixed position after photographing ends. This system is the same for a conventional silver halide camera and a digital camera, if it is a system of single-lens reflex.

One characteristic of a digital camera is that a picture can be taken when photographing while viewing a display device (for example, a liquid crystal monitor), and the image that is photographed can be checked immediately after it is taken.

However, if the system of a conventional reflecting mirror of a single-lens reflex camera is used, structurally, a monitor photographing mode that uses a liquid crystal monitor when photographing can not be realized.

Consequently, a single-lens reflex digital camera system in which photographing is possible also at the time of photographing with a liquid crystal monitor is proposed.

Patent Citation 1: Japanese Patent Laid-Open Publication No. 2001-125173

DISCLOSURE OF INVENTION

However, without looking through the optical viewfinder, a distance is created between the user and the digital camera body by using a liquid crystal monitor when photographing. Therefore, the posture of holding the digital camera body becomes unstable, and as a result, the body of the camera system easily shakes. In other words, the way that the body shakes differs with each photographing mode. For example, shaking (image blurring due to the movement of the body of the camera system caused by the shaking of the hands of the user and some other shaking, during photographing) in the monitor photographing mode that uses the liquid crystal monitor tends to have a great influence on the photographic image, compared to a viewfinder photographing mode that uses the optical viewfinder. Therefore, when taking a picture using a liquid crystal monitor, a camera system with a superior effect to correct (a correction of the image blurring caused by the movement of the body of the camera system) this blurring is preferable.

An object of the present invention is to improve the image blur correction effect in the monitor photographing mode in a camera system having the monitor photographing mode.

The camera system according to a first aspect of the present invention is a camera system for imaging a subject, and includes an imaging unit, an imaging optical system, an observing optical system, a display unit, a movable reflecting mirror, a reflecting mirror switching unit, a movement detection unit, an image blur correction unit, and a correction actuation unit. The imaging optical system leads the optical image of the subject to the imaging unit. The light from the imaging optical system can be observed with the observing optical system. The display unit displays an image obtained by the imaging unit. The reflecting mirror has a first state in which the light from the imaging optical system is led to the observing optical system, and a second state in which the light from the imaging optical system is led to the imaging unit. The reflecting mirror switching unit switches the first state and the second state of the reflecting mirror. The movement detection unit detects the movement of the camera system. The image blur correction unit corrects the blurring of an image that occurs due to the movement of the camera system, depending on the movement detected by the movement detection unit. The correction actuation unit makes the image blur correction unit perform a correction operation if the reflecting mirror is set in the second state by the reflecting mirror switching unit.

With this camera system, the light from the subject is led to the observing optical system or the imaging unit by the imaging optical system and the reflecting mirror. The first state of the reflecting mirror corresponds to the viewfinder photographing mode in which the optical image can be observed in the observing optical system. The second state of the reflecting mirror corresponds to the monitor photographing mode that the optical image can be observed at the display unit.

In this case, in the monitor photographing mode, the correction actuation unit forces the image blur correction unit to perform a correction operation. Therefore, to suppress the effect of the movement of the camera system becomes easy in the case of the monitor photographing mode, in which the effect is greater than that in the viewfinder photographing mode. In other words, in this camera system, it is possible to improve the correction effect in the monitor photographing mode.

The camera system according to a second aspect of the present invention is a camera system for imaging a subject, and includes an imaging unit, an imaging optical system, an observing optical system, a display unit, a movable reflecting mirror, a reflecting mirror switching unit, a movement detection unit, an image blur correction unit, and a selection unit. The imaging optical system leads the optical image of the subject to the imaging unit. The light from the imaging optical system can be observed with the observing optical system. The display unit displays an image obtained by the imaging unit. The reflecting mirror has a first state in which the light from the imaging optical system is led to the observing optical system, and a second state in which the light from the imaging optical system is led to the imaging unit. The reflecting mirror switching unit switches the first state and the second state of the reflecting mirror. The movement detection unit detects the movement of the camera system. The image blur correction unit corrects the blurring of an image which occurs due to the movement of the camera system, depending on the movement detected by the movement detection unit. The selection unit can select a different control property as the control property of the image blur correction unit for the detected movement, depending on the state of the reflecting mirror.

With this camera system, the control property of the image blur correction unit is selected depending on the state of the reflecting mirror, in other words, depending on whether it is the viewfinder or the monitor photographing mode. Therefore, an image blur correction can be performed by the most proper control property for each mode. As a result, in the monitor photographing mode, it is possible to improve the image blur correction effect of the monitor photographing mode, without being affected by the control property that is set in the viewfinder photographing mode.

The camera system according to a third aspect of the present invention is the camera system of the second aspect, and further includes a memory unit that stores the first and the second control property information that determines the control property of the image blur correction unit for the detected movement. The selection unit selects the first control property information as the control property that the image blur correction unit applies if the reflecting mirror is in the first state, and selects the second control property information as the control property that the image blur correction unit applies if the reflecting mirror is in the second state.

The camera system according to a fourth aspect of the present invention is the camera system of the third aspect, wherein the relationship between the frequency of the detected movement and the correction effect is included in the first and the second control property information. The frequency of movement in which the correction effect becomes the greatest in the second control property information is higher, compared to the first control property information.

The camera system according to a fifth aspect of the present invention is the camera system of the fourth aspect, wherein the display unit can be in a plurality of positions of different angles with respect to the optical axis of the imaging optical system. The memory unit further stores a third control property information. The selection unit selects either the second or the third control property information depending on the position of the display unit, if the reflecting mirror is in the second state.

The camera system according to a sixth aspect of the present invention is the camera system of the fifth aspect, wherein the display unit can be in a first position in which the display surface thereof is approximately orthogonal to the optical axis of the imaging optical system, and a second position in which the display surface is sloped with respect to the optical axis of the imaging optical system. The selection unit selects the second control property information as the control property that the image blur correction unit applies if the display unit is in the first position, and selects the third control property information as the control property that the image blur correction unit applies if the display unit is in the second state.

The camera system according to a seventh aspect of the present invention is the camera system of the second aspect, and further includes a mode switching unit which can switch a moving image photographing mode which can photograph a moving image and a still image photographing mode which can photograph a still image in the imaging unit. The selection unit selects a different control property as the control property of the image blur correction unit for the detected movement, depending on the photographing mode.

EXPLANATION OF REFERENCE

| | |
|---|---|
| L | Imaging optical system |
| Df | Defocus amount |
| X | Optical path |
| 1 | Digital camera |
| 2 | Lens barrel |
| 3 | Lens mount |
| 4 | Quick return mirror |
| 10 | Shutter unit |
| 11 | Imaging sensor |
| 12 | Sequence microcomputer |
| 16 | Liquid crystal monitor |
| 20 | Lens microcomputer |
| 21 | Shaking detection unit |
| 22 | Image blur correction lens group |
| 23 | Image blur correction unit drive control unit |
| 24 | Focus lens group |

-continued

| | |
|---|---|
| 29 | Quick return mirror drive control unit |
| 41 | Angular velocity sensor |
| 47 | Image blur correction unit |
| 50 | Release button |
| 51 | Photographing mode switch |
| 60, 61, 62, 63, 64, 65 | Control signal tables (control property information) |
| 100 | Camera system |

BEST MODE FOR CARRYING OUT THE INVENTION

First Embodiment

1: Overall Configuration

Figure 1:
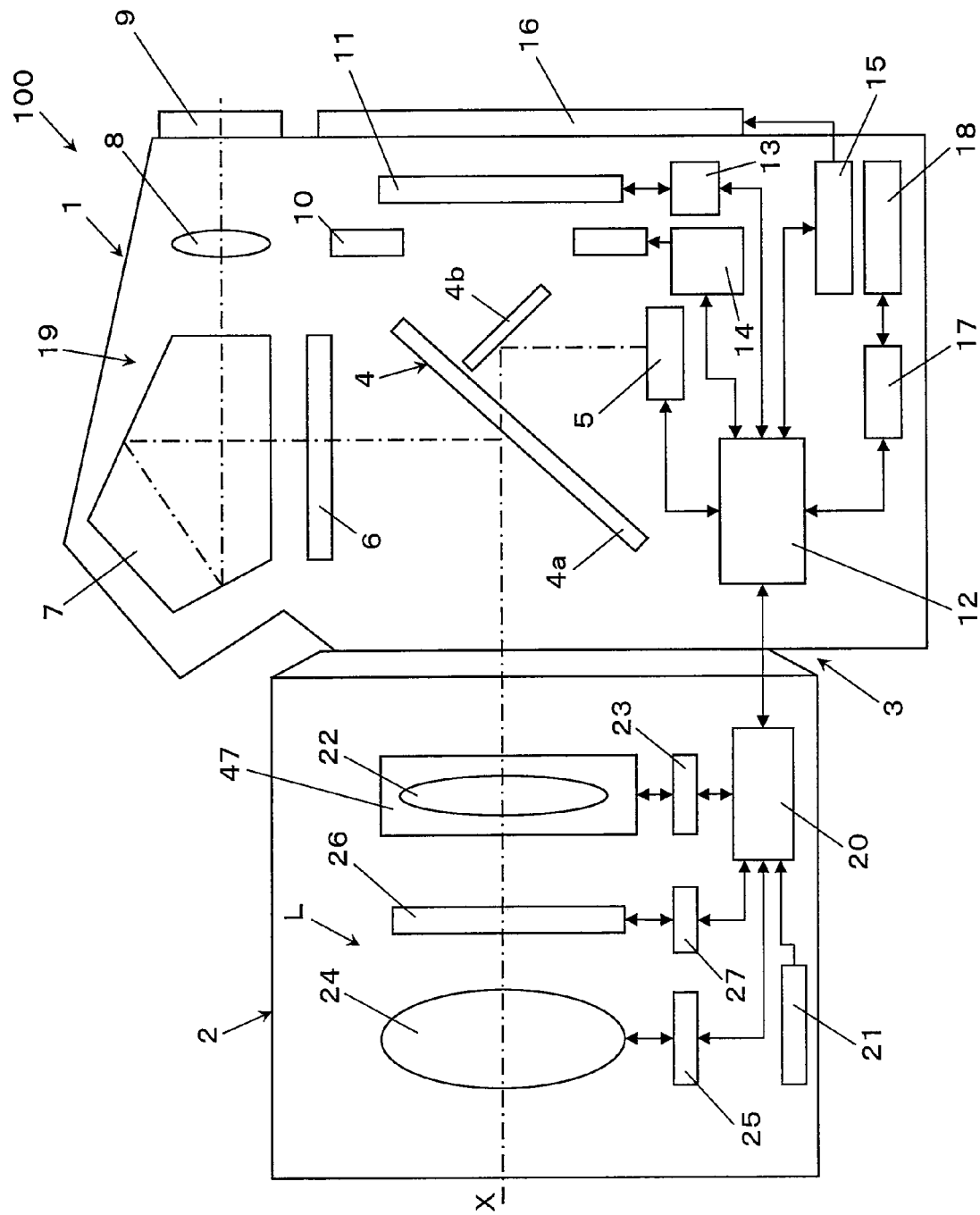
FIG. 1 is a diagram of the general configuration of the camera system according to a first embodiment of the present invention.
Figure 2:
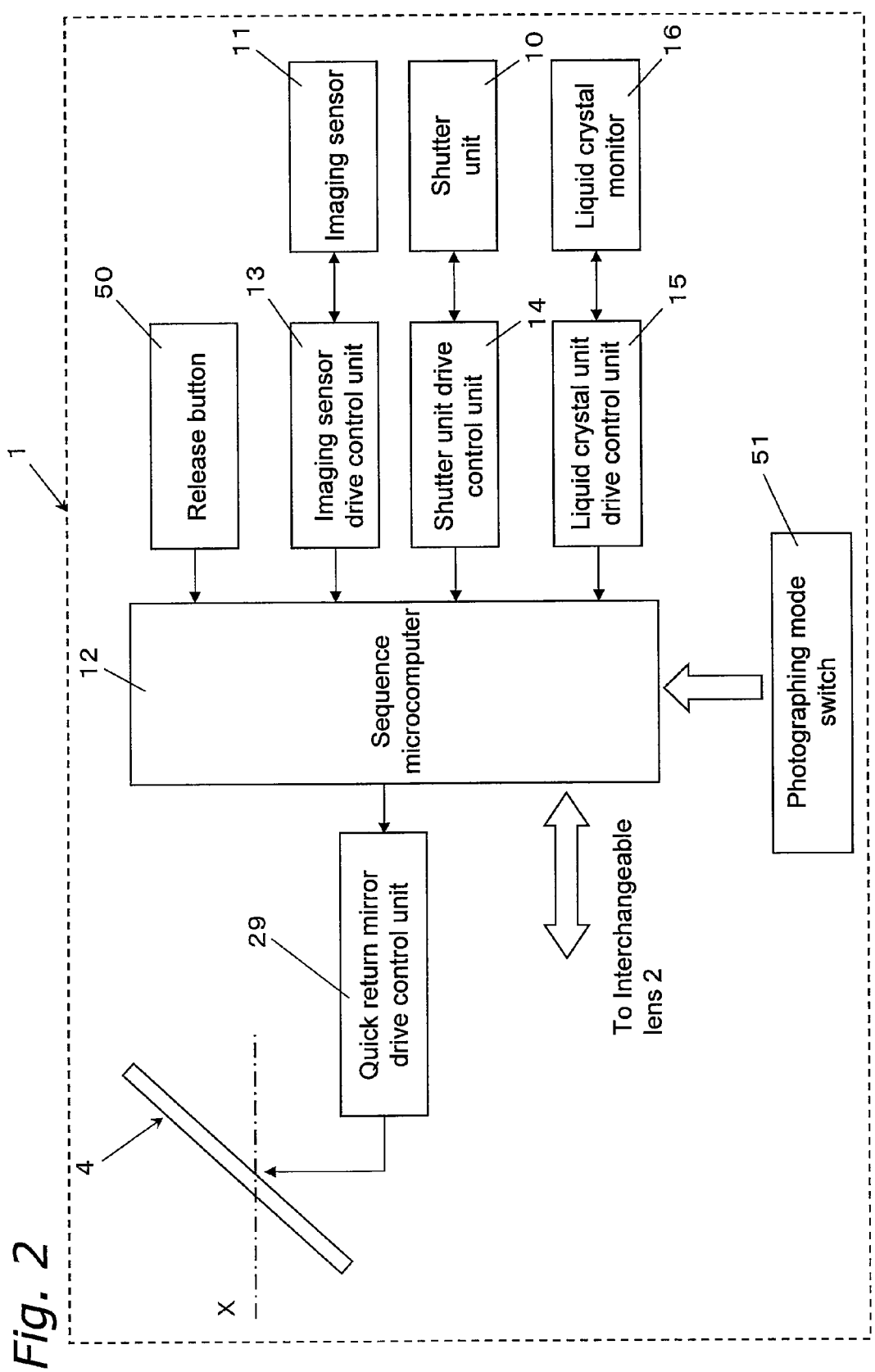
FIG. 2 is a block diagram of the camera system according to the first embodiment of the present invention.

A camera system 100 according to a first embodiment of the present invention will be described. FIG. 1 shows the general configuration of the camera system 100.

As shown in FIG. 1, the camera system 100 is a single-lens reflex digital camera of the interchangeable lens type, and includes a camera body 1 and an interchangeable lens 2 that is mounted detachably on the camera body 1. The interchangeable lens 2 is mounted detachably to a lens mount 3 that is provided on the front surface of the body of the camera body 1.

The light of the subject passed through the interchangeable lens 2 is divided into two light beams by a main mirror 4a of a quick return mirror 4, and the reflected light beam is guided to a viewfinder optical system 19. Meanwhile, the transmitted light beam is reflected by a sub mirror 4b that is arranged on the rear side of the quick return mirror 4, and is used as an AF light beam of a focus detection unit 5. In this focus detection unit 5, generally, a phase difference detection system is used.

The light beam reflected by the main mirror 4a forms an image on the viewfinder screen 6. The subject image formed on the viewfinder screen 6 can be observed from a viewfinder eyepiece window 9 via a pentaprism 7 and an eyepiece 8.

When photographing normally, the quick return mirror 4 is flipped outside the optical path X by a quick return mirror drive control unit 29, and a shutter unit 10 is opened and the subject image is formed on the imaging surface of an imaging sensor 11.

When photographing is not performed, as shown in FIG. 1, the quick return mirror 4 is put in the optical path X and the shutter unit 10 is in a closed state.

A sequence microcomputer 12 that controls various kinds of sequences is equipped in the interior of the camera body 1. An imaging sensor drive control unit 13 controls the drive of the imaging sensor 11. A shutter drive control unit 14 controls the drive of the shutter unit 10. An image display liquid crystal unit drive control unit 15 reads out image data by the imaging sensor 11, and controls an image display liquid crystal monitor 16 to display the photographed image after a predetermined image process. In addition, an image recording control unit 17 performs the reading and writing of the photographed image via an image recording unit 18 on a recording media such as a SD card and the like unshown in the figure.

The attachable and detachable interchangeable lens 2 includes an imaging optical system L for connecting the subject image to the imaging sensor 11 in the interior of the camera body 1. In addition, a lens microcomputer 20 containing various lens information and controlling various sequences inside the interchangeable lens 2 is equipped. In the interior of the interchangeable lens 2, a shake detection unit 21 that detects the amount of shake of an angular velocity sensor and the like, and an image blur correction unit drive control unit 23 that controls the drive of an image blur correction lens group 22 are equipped. By controlling the drive of this image blur correction lens group 22, a fine photographed image can be obtained with the effects from the shaking of the hands of the user and the like suppressed. In addition, a focus lens group drive control unit 25 that controls the drive of a focus lens group 24 is equipped in the interchangeable lens 2. Furthermore, an aperture drive control unit 27 that controls an aperture unit 26 is equipped in the interchangeable lens 2.

Figure 3:
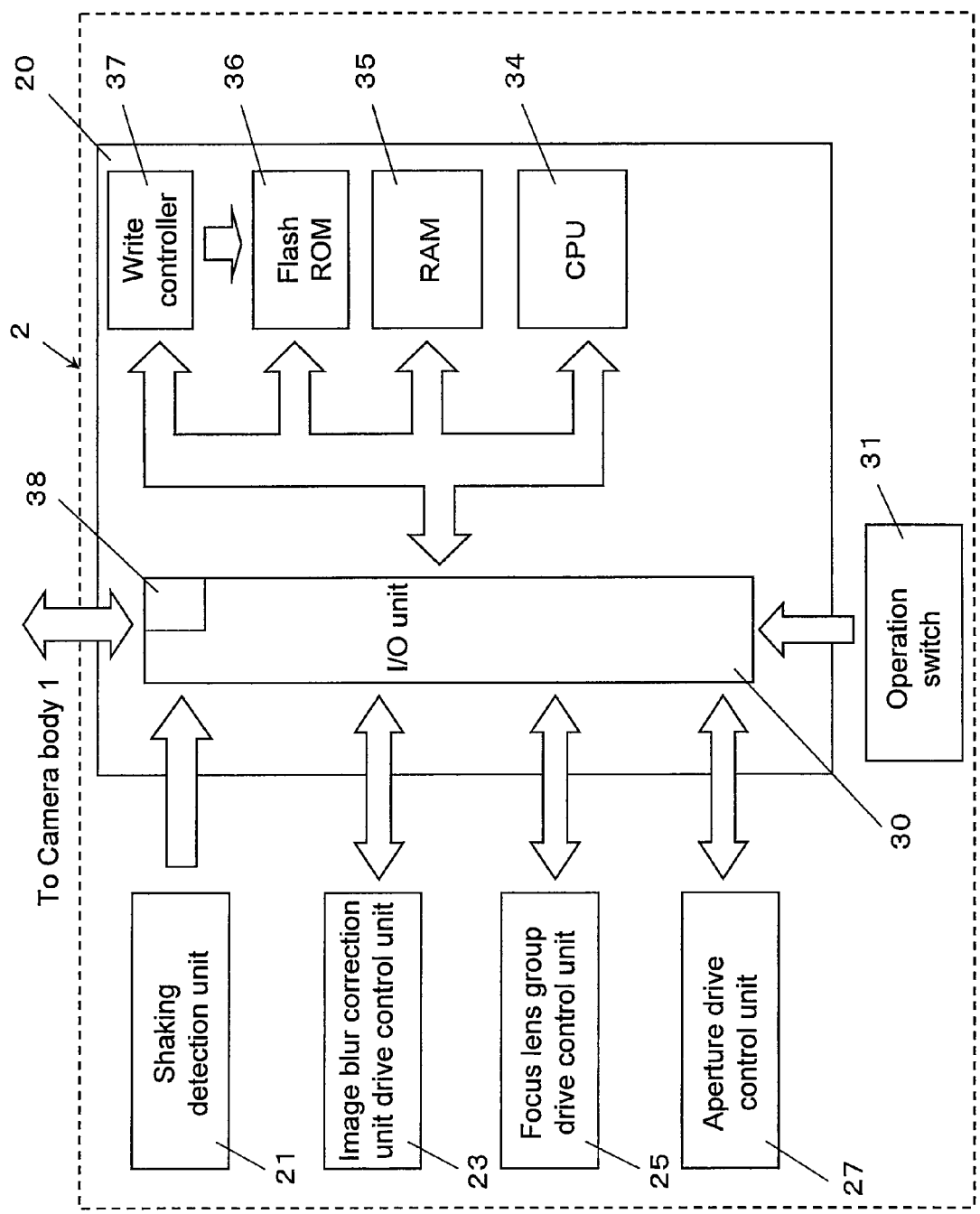
FIG. 3 is a block diagram showing the control system inside an interchangeable lens according to the first embodiment of the present invention.

Next, the lens microcomputer 20 that is equipped in the interior of the interchangeable lens 2 will be described using FIG. 3.

The lens microcomputer 20 includes an I/O unit 30, and performs communication with the shake detection unit 21, the image blur correction unit drive control unit 23, the focus lens group drive control unit 25, the aperture drive control unit 27, and an operation switch 31, via this I/O unit 30. This operation switch 31 is an operation unit for allowing the user to select whether or not to operate an image blur correction unit 47, for example, a switch of the ON and OFF style. In the case that ON is selected, an image blur correction will be performed corresponding to the output of the shake detection unit 21. In the case that OFF is selected, the image blur correction lens group 22 will be kept on the center of the optical axis, and the image blur correction operation stops. A serial I/O unit 33 performs serial communication of data and the like with the camera body 1. Furthermore, a CPU 34 is for performing a calculation control and the like, and is connected by an interior bus with each of the RAM (random access memory) 35, a flash ROM 36 that is a nonvolatile memory, and a write controller 37 that is a write circuit for writing a program in this flash ROM 36. In addition, the flash ROM 36 stores various programs, data that shows the relationship of the amount of movement of the focus lens group 24 to the focal length and the distance to the subject, data that shows the shift amount from the center of the optical axis of the image blur correction lens group 22 corresponding to the focal length, and the like are stored.

Figure 4:
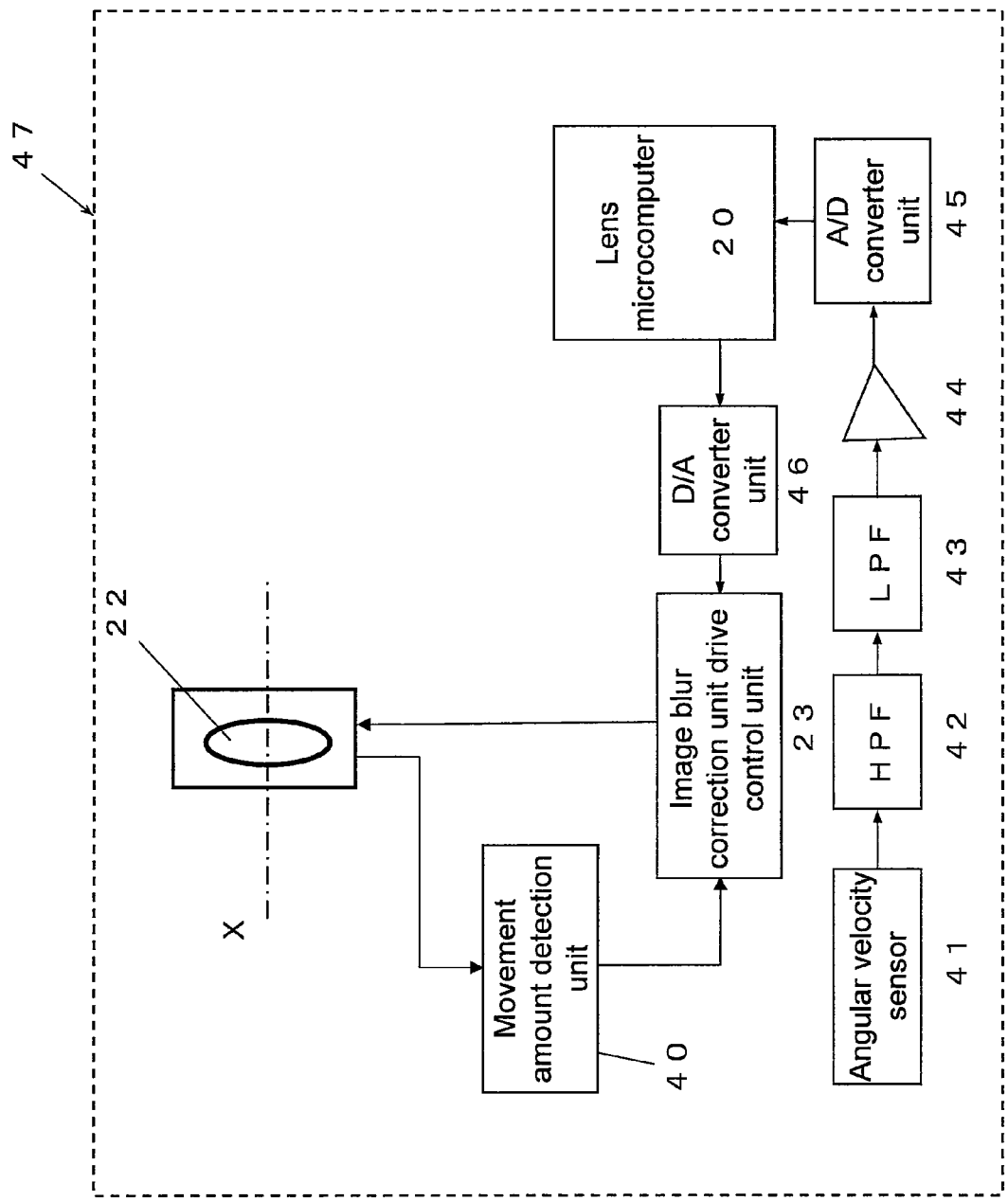
FIG. 4 is a block diagram of the hardware of an image blur correction unit according to the first embodiment of the present invention.

Next, the image blur correction unit 47 will be described using FIG. 4. The image blur correction unit drive control unit 23 is a control unit for controlling the drive of the image blur correction lens group 22, and moves the image blur correction lens group 22 up and down and left and right, within the plane that is orthogonal to the optical axis of the imaging optical system L. A movement amount detection unit 40 is a detection unit for detecting the actual amount of movement of the image blur correction lens group 22, and forms a feedback control loop that is for controlling the drive of the image blur correction lens group 22 with the image blur correction unit drive control unit 23.

An angular velocity sensor 41 is a sensor for detecting the movement of the camera system 100 itself that includes the imaging optical system L, and outputs both a positive and a negative angular speed signal depending on the direction of the movement of the camera system 100, based on an output in the state that the camera system 100 is stationary. Two angular velocity sensors 41 that detect the movement of each direction (the yawing and the pitching) are provided. FIG. 4 shows only one direction. In this way, the angular velocity sensor 41 has a function of a movement detection unit that detects the movement of the camera system 100 due to the shaking of hands and some other shaking.

A HPF 42 is a high-frequency pass filter that removes direct current drift component in the unwanted band component included in the output of the angular velocity sensor 41. A LPF 43 is a low-pass filter that removes the resonance frequency component and the noise component of the sensor in the unwanted band component included in the output of the angular velocity sensor 41. An amplifier 44 is a circuit for adjusting the output signal level of the angular velocity sensor. An A/D converter unit 45 is a converter unit that converts the output signal of the amplifier 44 into a digital signal, and the output thereof is sent to the lens microcomputer 20.

The lens microcomputer 20 performs filtering, integral treatment, phase compensation, gain adjustment, clip process and the like with respect to the output signal of the angular velocity sensor 41 obtained via the A/D converter unit 45, and is a control signal generating unit that finds and outputs a drive control amount (hereinafter, referred to as control signal) that is necessary in the image blur correction of the image blur correction lens group.

As described above, the image blur correction unit 47 is formed by the image blur correction lens group 22, the image blur correction unit drive control unit 23, the angular velocity sensor 41, the lens microcomputer 20, and the like.

3: Operation

Next, the photographing operation of the camera system 100 will be described.

3.1: Viewfinder Photographing Mode

Figure 5:
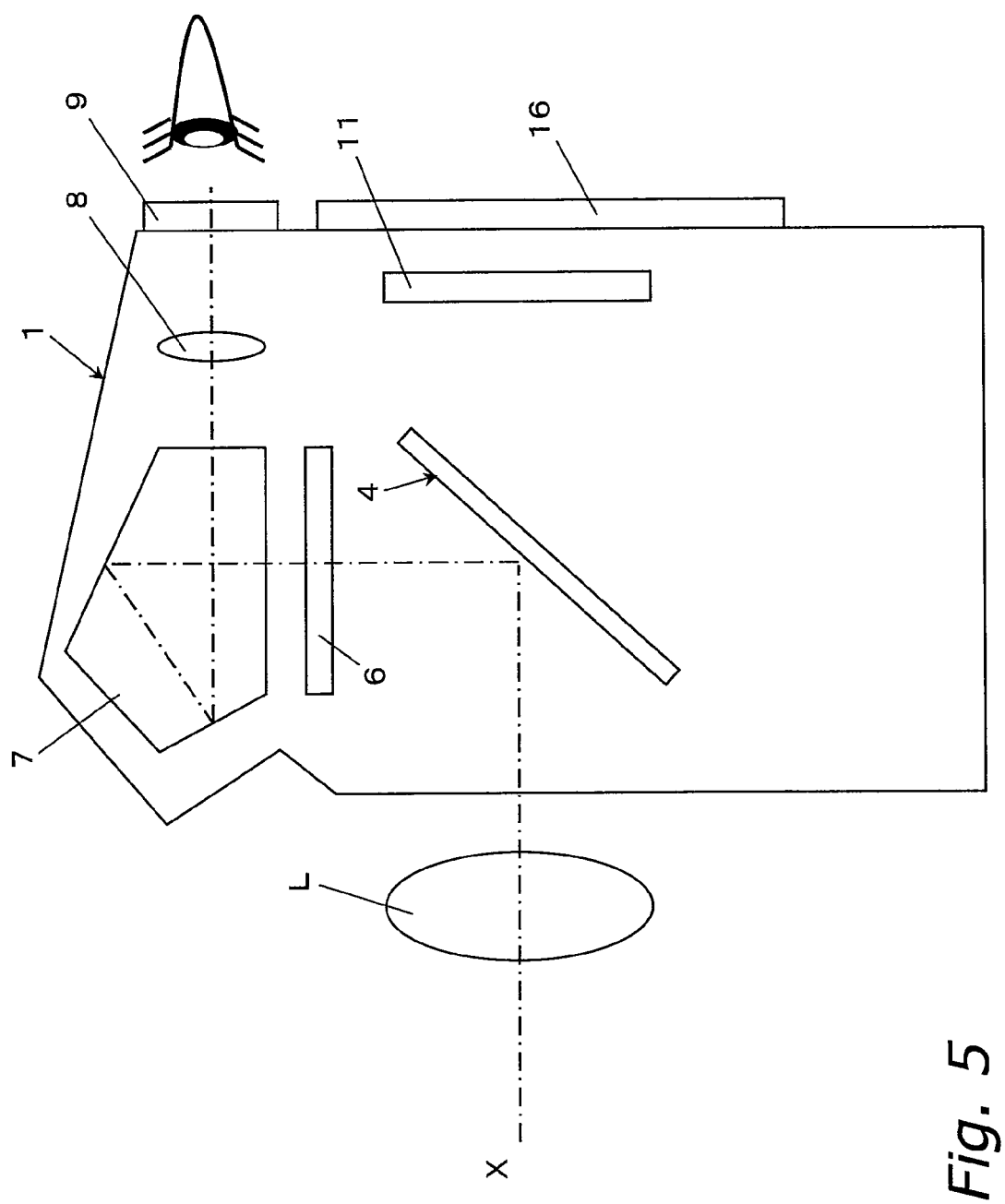
FIG. 5 is a conceptual diagram for explaining a viewfinder photographing mode according to the first embodiment of the present invention.

First, the drive sequence in the case that a picture is taken with the user looking through the viewfinder eyepiece window 9 (viewfinder photographing mode) will be described using FIG. 5.

Power is supplied to the sequence microcomputer 12 and various units in the interior of the camera body 1, by the operation of the user pressing the release button 50 half way down. The sequence microcomputer 12 in the interior of the camera body 1 that is actuated by the power supply receives various lens data via an electrical segment 38 of the lens mount 3 from the lens microcomputer 20 in the interior of the interchangeable lens 2 actuated also by the power supply, and stores them in a built-in memory. Next, the sequence microcomputer 12 obtains a defocus amount (hereinafter, referred to as Df amount) via the focus detection unit 5, and instructs the lens microcomputer 20 to drive the focus lens group 24 by this Df amount. The lens microcomputer 20 controls the focus lens group drive control unit 25, and operates the focus lens group 24 only by the Df amount. In this way, the Df amount becomes smaller while repeating the focus detection and the drive of the focus lens group 24, and when the Df amount becomes equal to or below a predetermined amount, it is determined that focus is met, and the drive of the focus lens group 24 stops.

Then, with the operation of the release button 50 being pressed all the way down, the sequence microcomputer 12 instructs the lens microcomputer 20 to make the aperture value calculated based on the output from a photometric sensor that is not shown in the figure. Then, the lens microcomputer 20 controls the aperture drive control unit 27 and reduces the aperture to the aperture value that is instructed. The sequence microcomputer 12 retracts the quick return mirror 4 from the optical path X via the quick return mirror drive control unit 29, simultaneously with the instruction of the aperture value. After retraction is completed, the imaging sensor drive control unit 13 instructs the drive of the imaging sensor 11, and instructs the operation of the shutter unit 10. In addition, the imaging sensor drive control unit 13 exposes the imaging sensor 11 only for a shutter speed time calculated based on the output from the photometric sensor that is not shown in the figure.

After the exposure is completed, the imaging sensor drive control unit 13 reads out the image data by the imaging sensor 11, and controls the photographed image to be displayed on the image display liquid crystal monitor 16 after a predetermined image process. The image data is written in a memory media via the image recording unit 18. In addition, after the exposure ends, the quick return mirror 4 and the shutter unit 10 are reset at their initial positions. The sequence microcomputer 12 instructs the lens microcomputer 20 to reset the aperture to the open position, and the lens microcomputer 20 performs a reset command for each unit. After resetting is completed, the lens microcomputer 20 informs the sequence microcomputer 12 that the reset has been completed. The sequence microcomputer 12 waits for the reset completion information from the lens microcomputer 20 and the completion of a series of processes after the exposure. Then, the sequence microcomputer 12 confirms that the release button is in the state of not being pressed, and the photographing sequence ends.

3.2: Monitor Photographing Mode

Figure 6:
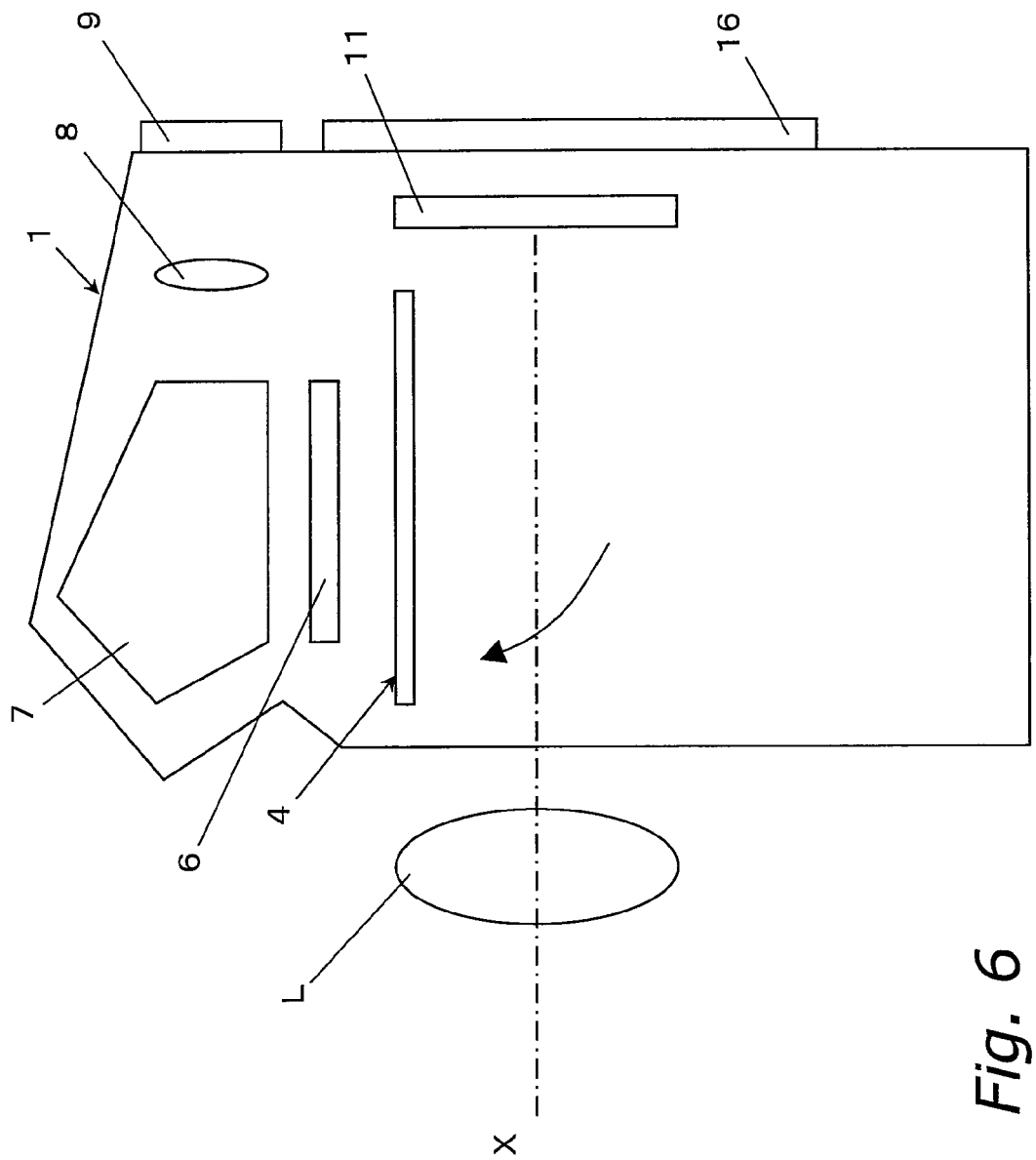
FIG. 6 is a conceptual diagram for explaining a monitor photographing mode according to the first embodiment of the present invention.

Next, the drive sequence in the case that the user takes a picture using the liquid crystal monitor 16 (monitor photographing mode) will be described using FIG. 6.

When taking a picture using the liquid crystal monitor 16, a photographing mode switch 51 is switched from OFF to ON. When the photographing mode switch 51 is turned ON, the transition operation to the monitor photographing mode is started. More specifically, the sequence microcomputer 12 retracts the quick return mirror 4 from the optical path X by the quick return mirror drive control unit 29. As a result, the subject image reaches the imaging sensor 11. The imaging sensor drive control unit 13 reads out the image data by the imaging sensor 11, and displays the photographed image on the image display liquid crystal monitor 16 after a predetermined image process. In this way, by displaying the photographed image on the liquid crystal monitor 16, the user can follow a subject without looking through the viewfinder eyepiece window 9.

Next, with the operation of the user pressing the release button 50 half way down, the sequence microcomputer 12 of the camera body 1 receives various lens data sent from the lens microcomputer 20 in the interior of the interchangeable lens 2, via the electrical segment 38 of the lens mount 3. The lens data is stored in the built-in memory in the lens microcomputer 20. Next, the sequence microcomputer 12 returns the quick return mirror 4 to the fixed position in the optical path X via the quick return mirror drive control unit 29, and obtains a Df amount by the focus detection unit 5. The sequence microcomputer 12 instructs the lens microcomputer 20 to drive the focus lens group 24 only by this Df amount. The lens microcomputer 20 controls the focus lens group drive control unit 25, and moves the focus lens group 24 by only the Df amount. In this way, the Df amount becomes smaller while repeating the focus detection and the drive of the focus lens group 24. When the Df amount becomes equal to or below a predetermined amount, it is determined that focus is met, and the drive of the focus lens group 24 stops.

Then, with the operation of the release button 50 being pressed all the way down, the sequence microcomputer 12 instructs the lens microcomputer 20 to drive the aperture unit 26 so that the state of the aperture of the aperture unit 26 becomes the aperture value that is calculated based on the output from the photometric sensor. The lens microcomputer 20 controls the aperture drive control unit 27, and reduces the aperture unit 26 to the aperture value that is instructed. The sequence microcomputer 12 retracts the quick return mirror 4 from the optical path X via the quick return mirror drive control unit 29 simultaneously with the instruction of the aperture value. After the retraction is completed, the imaging sensor drive control unit 13 drives the imaging sensor 11, and drives the shutter unit 10. In addition, the imaging sensor drive control unit 13 exposes the imaging sensor 11 only for the shutter speed time that is calculated based on the output from the photometric sensor.

After the exposure is completed, the imaging sensor drive control unit 13 reads out the image data via the imaging sensor 11. The imaging sensor drive control unit 13 displays the photographed image on the image display liquid crystal monitor 16 after a predetermined image process. The image data is written in the memory media via the image recording unit 18. In addition, after the exposure is completed, the quick return mirror 4 is kept in the retracted state from the optical path X by the quick return mirror drive control unit 29. By doing so, it is possible to continue the monitor photographing mode.

In addition, in the case of canceling the monitor photographing mode, the photographing mode switch 51 is operated, and the photographing mode is changed from the monitor photographing mode to the viewfinder photographing mode that is used normally. More specifically, the quick return mirror 4 is returned to a predetermined position in the optical path X by the quick return mirror drive control unit 29. In addition, even when the power of the camera body 1 is cut off, the quick return mirror 4 is returned to the predetermined position in the optical path X.

3.3: Operation During the Switching of the Photographing Mode

Figure 7:
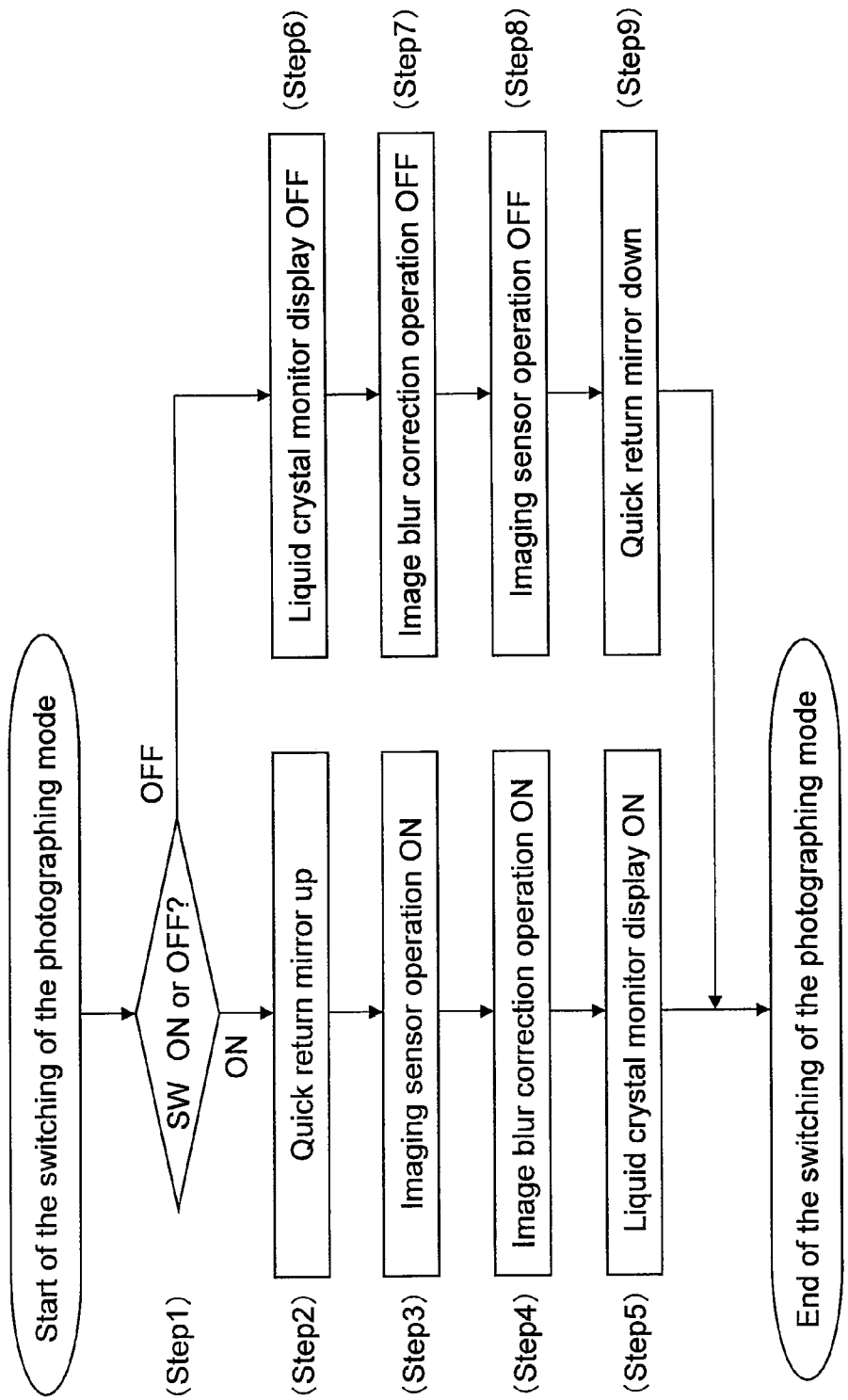
FIG. 7 is a flowchart showing the sequence of a photographing mode according to the first embodiment of the present invention.

Next, the operation during the switching of the photographing mode at the time of using the camera system 100 will be described in detail using the flowchart shown in FIG. 7.

The sequence microcomputer 12 of the camera body 1 monitors the ON/OFF state of the photographing mode switch 51 during the time the camera system 100 is being used (when power is ON) (Step 1). When the photographing mode switch 51 is turned from OFF to ON, the procedure of Step 2 is started, and when the switch is turned from ON to OFF, the procedure of Step 6 is started (Step 1).

If the photographing mode switch 51 is turned from OFF to ON, the quick return mirror drive control unit 29 retracts the quick return mirror 4 away from the optical path X (Step 2), and the operation of the imaging sensor 11 is started by the imaging sensor drive control unit 13 (Step 3). Next, information on the photographing mode switch 51 is sent from the sequence microcomputer 12 to the lens microcomputer 20. The lens microcomputer 20 make the image blur correction unit 47 start the image blur correction operation via the image blur correction unit drive control unit 23, based on this information (Step 4). At this time, the operation of the image blur correction unit 47 is started without any relationship with the state of the operation switch 31. In other words, whether or not to start the operation of the image blur correction unit 47 is judged based on the state of the photographing mode switch 51, and not based on the state of the operation switch 31. Then, the photographed image is displayed on the liquid crystal monitor 16 (Step 5), and the switching operation from the viewfinder photographing mode to the monitor photographing mode ends.

Meanwhile, in the case that the photographing mode switch 51 is turned from ON to OFF, the liquid crystal monitor 16 becomes OFF (Step 6), and the image blur correction unit 47 becomes OFF (Step 7). At this time, the ON and OFF of the image blur correction unit 47 may be determined by the state of the operation switch 31. Furthermore, the drive of the imaging sensor 11 is stopped by the imaging sensor drive control unit 13 (Step 8), and the quick return mirror 4 is put in the optical path X by the quick return mirror drive control unit 29 (Step 9). By doing so, the switching operation from the monitor photographing mode to the viewfinder photographing mode ends.

In addition, in the case that the image blur correction unit 47 is OFF in Step 7, the image blur correction lens group 22 is kept in the center of the optical axis electrically or mechanically. The method of keeping the image blur correction lens group 22 may be either a method of passing electric current to an actuator via the image blur correction unit drive control unit 23, or a method of locking the image blur correction lens group 22 by a mechanical method. In the case of locking it by a mechanical method, since it is not necessary to apply electric current, it is possible to reduce the consuming electricity.

4: Advantages

Normally, in the viewfinder photographing mode, since the eye of the user comes near the viewfinder eyepiece window 9, as a result of this, the camera system 100 is supported by the hand and the face of the user. Therefore, it is possible to reduce the shaking of the camera system 100 when photographing.

In contrast, in the monitor photographing mode, the user looks at the liquid crystal monitor 16 to take a picture. In order to look at the liquid crystal monitor 16, the distance between the camera system 100 and the user becomes longer inevitably. Therefore, the photographing posture becomes unstable, and the shaking occurs easily in the camera system 100, and the effect of the shaking on the photographed image becomes large.

However, in this camera system 100, as described above, by forcibly performing an image blur correction operation via the image blur correction unit 47 in the case of the monitor photographing mode, it is possible to largely reduce the frequency that an unsuccessful picture is taken due to the shaking, compared to when the image blur correction operation is not performed (for example, in the case of not performing the image blur correction operation via the image blur correction unit 47 in the monitor photographing mode)

As described above, in the camera system 100 according to the present embodiment, in the monitor photographing mode using the liquid crystal monitor 16, even if the user does not select the image blur correction mode or even if the user forgot to select it, the image blur correction operation is forcibly performed. Therefore, when using the liquid crystal monitor 16, even if the photographing posture is less stable than the viewfinder photographing mode, it is possible to reduce the effect of the shaking of the camera system 100. As a result, it is possible to obtain a photographed image with the shaking suppressed even in the case of the monitor photographing mode.

Second Embodiment

In the viewfinder photographing mode and the monitor photographing mode, sometimes the shaking frequency is different. Therefore, performing an image blur correction operation that is suitable for the shaking frequency of each mode is considered. A camera system according to a second embodiment of the present invention is described below. In addition, those described in the first embodiment will be given the same numerals, and the descriptions thereof will be omitted. The transition to the monitor photographing mode will be described using the flowchart shown in FIG. 11.

1: Frequency Characteristic of the Image Blur Correction Unit

Figure 8:
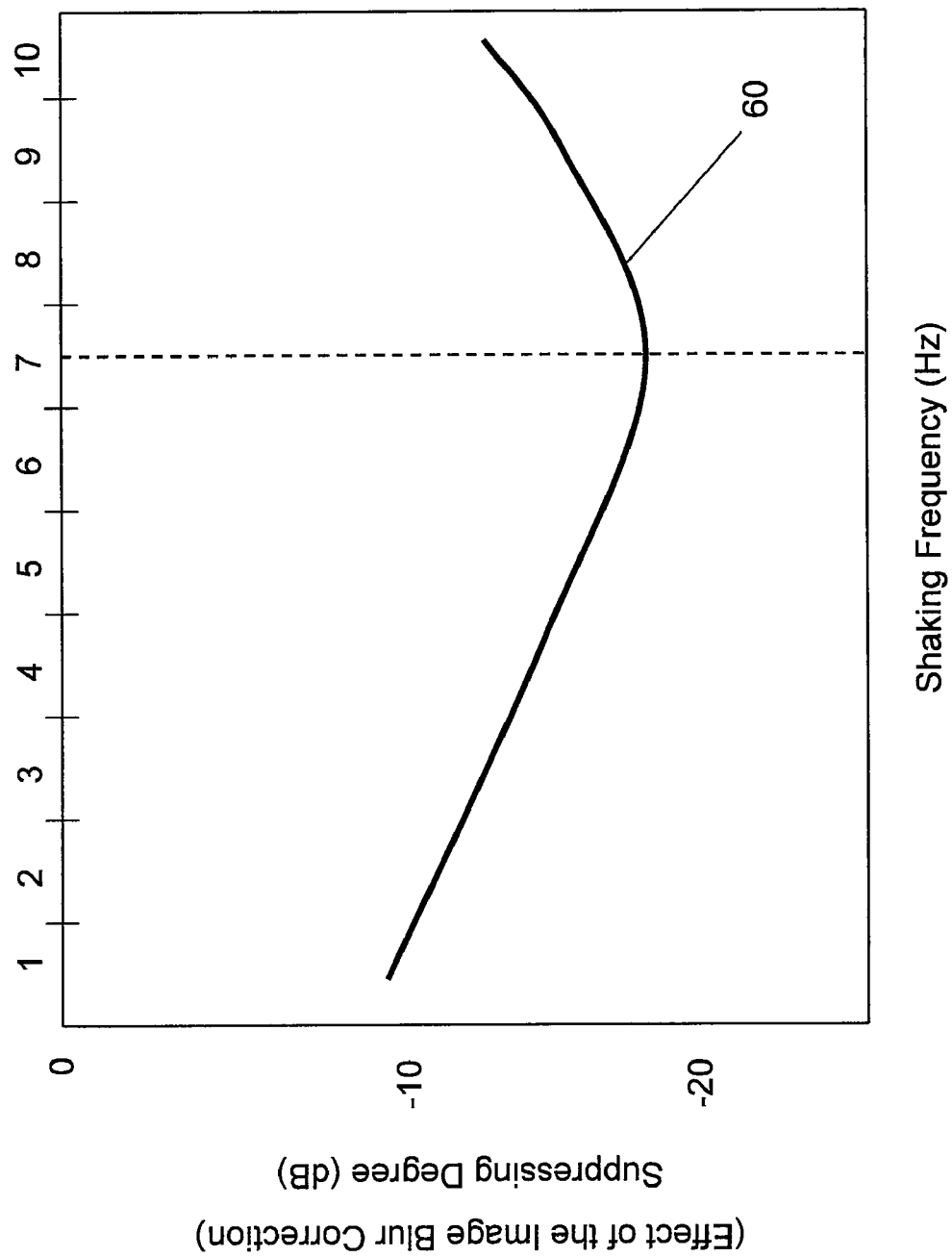
FIG. 8 is a conceptual diagram showing the effect of the image blur correction of a control signal table.

The control property of the image blur correction unit will be described using FIG. 8. In FIG. 8, the horizontal axis shows the shaking frequency Fcs (Hz), and the vertical axis shows the shaking suppressing degree Scs (dB). Here, the shaking suppressing degree Scs is an indicator that shows the degree of the effect of the image blur correction, and it is defined by the formula below.

$$Scs = 20 \cdot \log (Ar/Acs) \qquad (1)$$

However, Acs: shaking amount (shaking amount of the image that occurs due to the shaking of the camera system)

Ar: the remaining shaking amount

Figure 9:
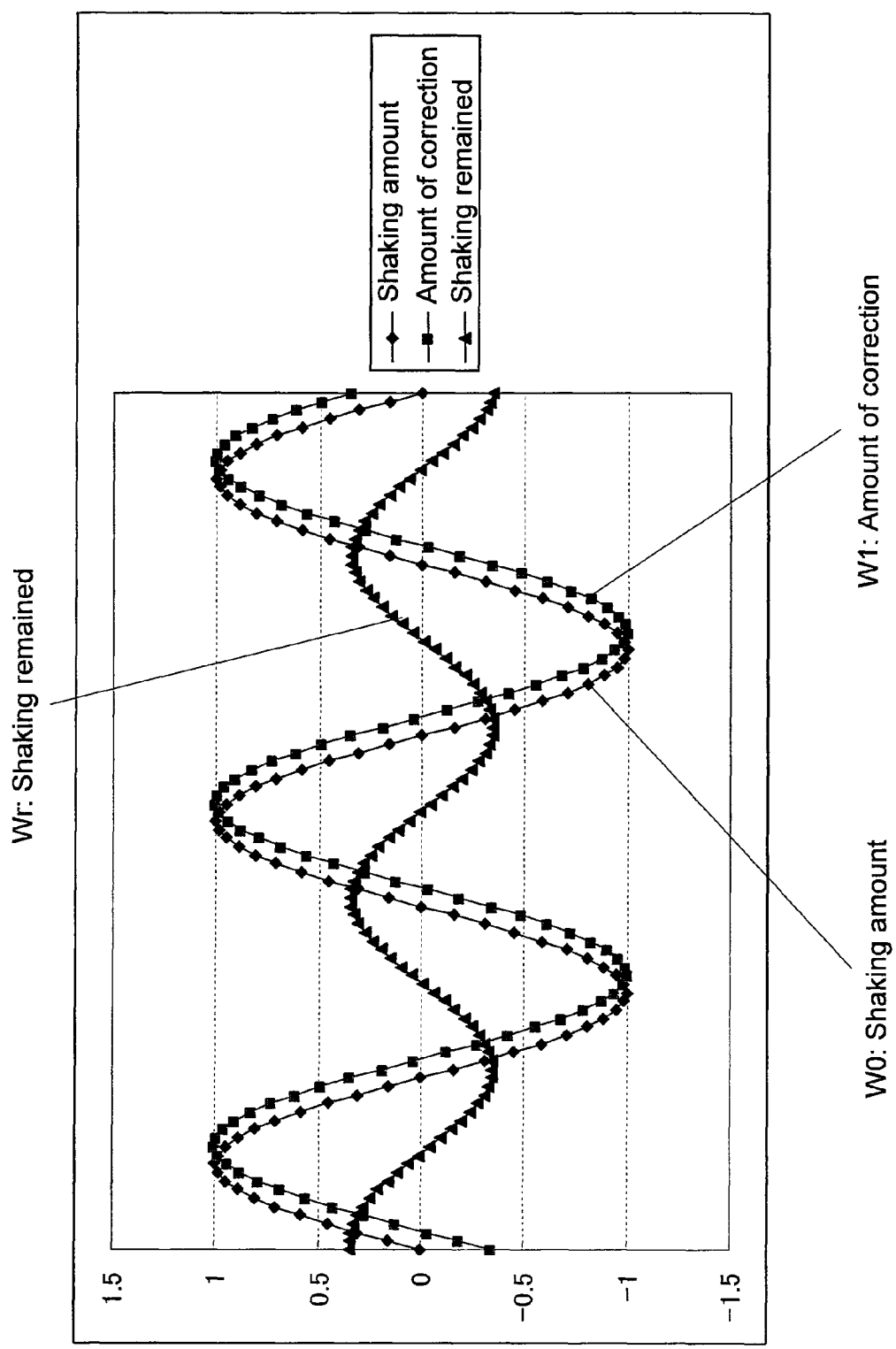
FIG. 9 is a diagram for explaining the remaining image blur amount.

In the above definitional equation (1), the shaking amount Acs and the remaining shaking amount Ar correspond to the amplitude of the shaking amount indicated by the curve W0 and the amplitude of the remaining shaking amount indicated by the curve Wr that are shown in FIG. 9 respectively.

According to the definition of the shaking suppressing degree Scs described above, the lower the numeric value of the suppressing degree Scs is (the greater the absolute value of the suppressing degree Scs is), the superior the image blur correction capability is. Normally, the shaking frequency Fcs of the user is to the degree from 1 to 10 (Hz). However, it is difficult to improve the image blur correction capability with respect to all frequencies, in other words, to make the suppressing degree Scs constant. Therefore, normally, the frequency property is set so that the image blur correction capability with respect to a specific frequency improves.

According to the description above, as shown in FIG. 8, the shaking suppressing degree Scs changes depending on the shaking frequency Fcs (hereinafter, the dependency with respect to the shaking frequency Fcs of the shaking suppressing degree Scs is referred to as "frequency property of the image blur correction"). In other words, the image blur correction capability (the effect of the image blur correction) in the image blur correction unit 47 depends on the shaking frequency Fcs, and becomes maximum on a specific shaking frequency Fcs (The absolute value of the shaking suppressing degree Scs becomes maximum. The shaking frequency at that time is called the optimal shaking frequency.). For example, as shown in FIG. 8, in the case that the shaking frequency of a great number of the user is to the degree of 7 (Hz), the frequency property of the image blur correction is set in advance so that the capacity of the image blur correction unit 47 becomes maximum on this frequency 7 (Hz).

In this way, by adjusting the frequency property of the image blur correction according to a supposed shaking frequency in advance, an image blur correction that is proper for this shaking frequency becomes possible. As a result, a fine photographed image can be obtained with the effect of the shaking of the user eliminated.

However, as described in <4: Advantages> in the first embodiment, sometimes the shaking frequency is different due to the photographing posture of the user. For example, the camera system 100 shakes easily in the monitor photographing mode, compared to the viewfinder photographing mode. Therefore, the shaking frequency in the monitor photographing mode is shifted to higher, compared to the viewfinder photographing mode. In this case, even if either shaking frequency is set by adjusting the control property of the image blur correction unit 47, this control property will not have the highest image blur correction effect for the other shaking frequency.

In other words, it is not possible to handle two photographing modes with different properties of shaking frequencies, in the case of using one frequency property of image blur correction as is conventionally done.

Figure 10:
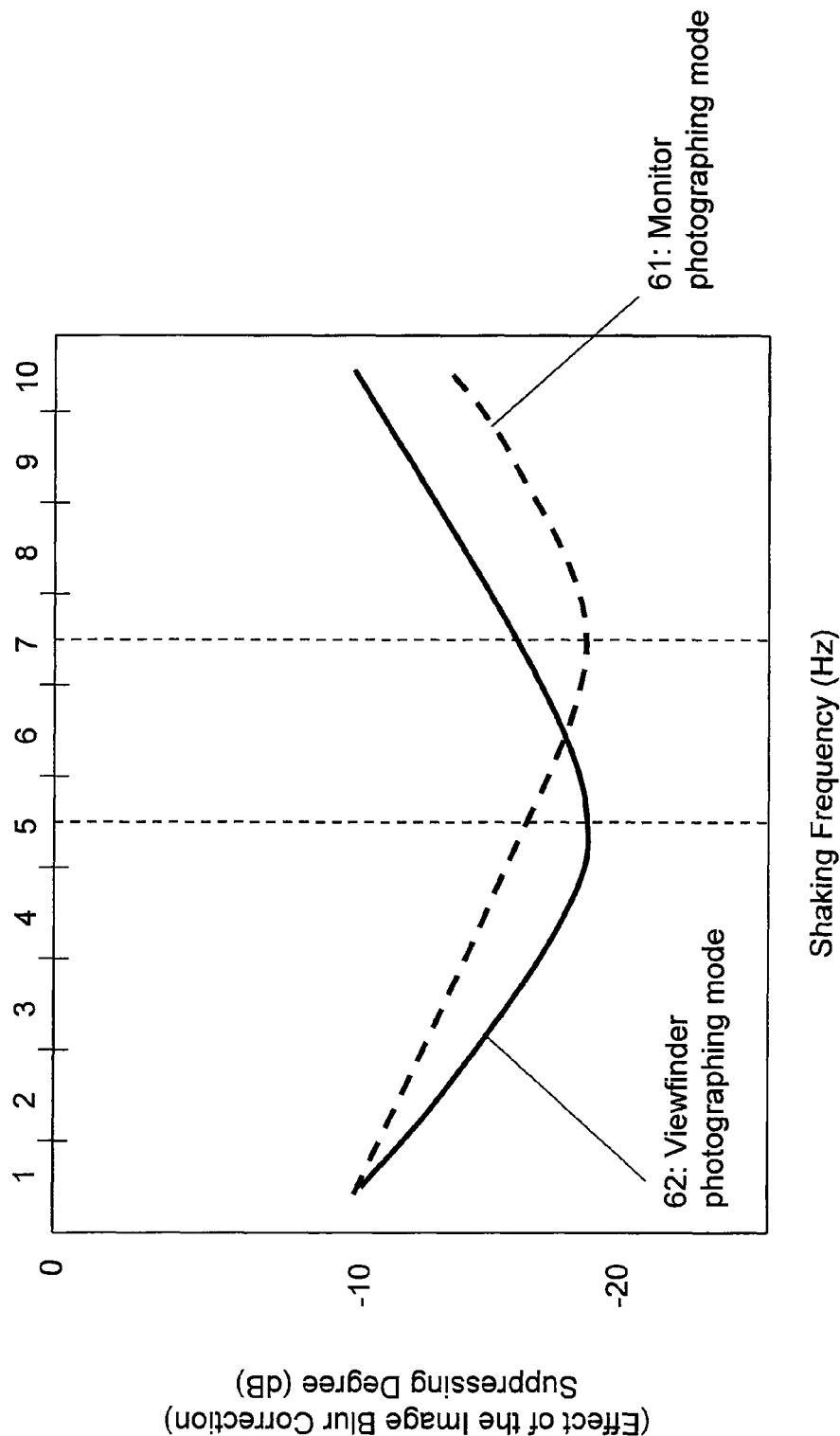
FIG. 10 is a conceptual diagram showing the effect of the image blur correction of a control signal table according to a second embodiment of the present invention.

Consequently, the camera system according to the present embodiment includes a function for selecting the most proper frequency property of image blur correction according to the photographing mode, for each photographing mode. More specifically, in the flash ROM 36 in the interior of the interchangeable lens 2, a plurality of control signal tables (control property information) that shows the relationship between the shaking frequencies and the suppressing degrees are stored. In the present embodiment, as shown in FIG. 10, two kinds of control signal tables 61 and 62 are used, corresponding to the viewfinder photographing mode and the monitor photographing mode. For example, the most proper shaking frequency is set around 5 (Hz) in the control signal table 61 that corresponds to the viewfinder photographing mode, and the most proper shaking frequency is set around 7 (Hz) in the control signal table 62 that corresponds to the monitor photographing mode,. Then the table corresponding to the photographing mode is selected by the lens microcomputer 20 according to the photographing mode.

2: Operation at the Time of Switching the Photographing Mode

The operation at the time of switching the photographing mode will be described using FIG. 11.

Figure 11:
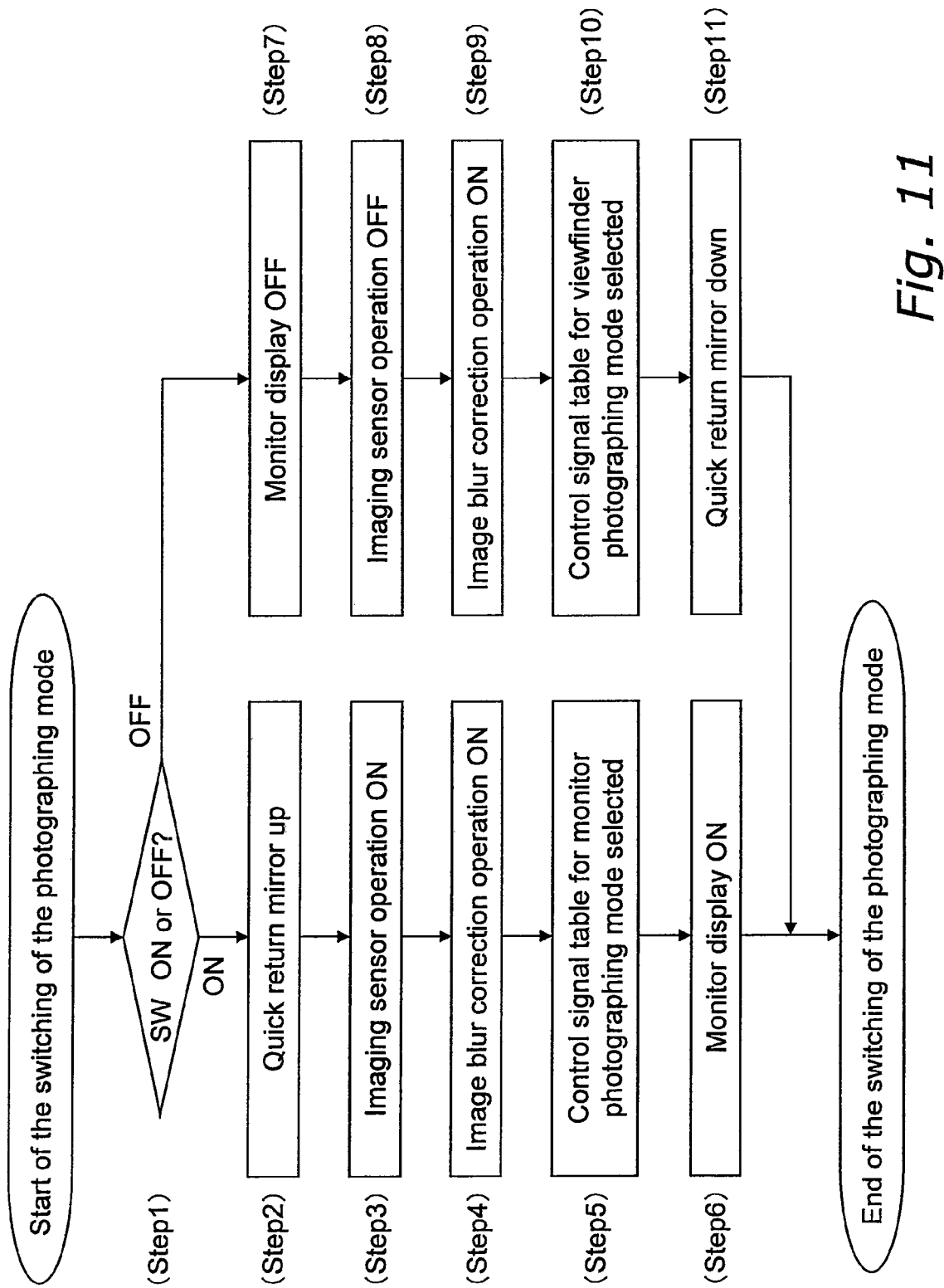
FIG. 11 is a flowchart showing the sequence of a photographing mode according to the second embodiment of the present invention.

As shown in FIG. 11, the sequence microcomputer 12 of the camera body 1 monitors the ON/OFF state of the photographing mode switch 51 during the time the camera system 100 is being used (when the power is ON) (Step 1). When the photographing mode switch 51 is turned from OFF to ON, the procedure of Step 2 is started, and when the switch is turned from ON to OFF, the procedure of Step 7 is started (Step 1).

If the photographing mode switch 51 is turned from OFF to ON, the quick return mirror drive control unit 29 retracts the quick return mirror 4 away from the optical path X (Step 2), and the operation of the imaging sensor 11 is started by the imaging sensor drive control unit 13 (Step 3). Next, information on the photographing mode switch 51 is sent from the sequence microcomputer 12 to the lens microcomputer 20. The lens microcomputer 20 make the image blur correction unit 47 start the image blur correction operation via the image blur correction unit drive control unit 23, based on this information (Step 4). At this time, the particular control property for the monitor photographing mode is selected as the control property of the image blur correction unit 47 (Step 5). More specifically, the control signal table 61 shown in FIG. 10 is selected by the lens microcomputer 20. The image blur correction unit 47 performs the image blur correction operation based on this selected control signal table 61. Furthermore, the photographed image is displayed on the liquid crystal monitor 16 (Step 6), and the switching operation from the viewfinder photographing mode to the monitor photographing mode ends.

Meanwhile, in the case that the photographing mode switch 51 is turned from ON to OFF, the liquid crystal monitor 16 becomes OFF (Step 7), the drive of the imaging sensor 11 is stopped by the imaging sensor drive control unit 13 (Step 8), and the image blur correction unit 47 becomes OFF (Step 9). At this time, the ON and OFF of the image blur correction unit 47 may be determined by the state of the operation switch 31. In the case that the image blur correction unit 47 performs the correction operation, the particular control property for the viewfinder photographing mode is selected as the control property of the image blur correction unit 47 (Step 10). More specifically, the control signal table 62 shown in FIG. 10 is selected by the lens microcomputer 20. Therefore, as shown in FIG. 10, in this viewfinder photographing mode, the image blur correction property becomes most excellent around the shaking frequency 5 (Hz). Furthermore, the quick return mirror 4 is put in the optical path X by the quick return mirror drive control unit 29 (Step 11), and the switching operation from the monitor photographing mode to the viewfinder photographing mode ends.

As described above, in the camera system 100 according to the present embodiment, the most proper control property of the image blur correction for the selected photographing mode is applied in the image blur correction unit 47, in response to the switching between the monitor photographing mode and the viewfinder photographing mode. By doing so, it is possible to perform the most proper image blur correction control for the photographing mode thereof in each photographing mode, and it is possible to accomplish a more effective image blur correction.

In addition, in the case that the image blur correction unit 47 is OFF in Step 8, the image blur correction lens group 22 is kept in the center of the optical axis electrically or mechanically. The method of keeping the image blur correction lens group 22 may be either a method of passing electric current to an actuator via the image blur correction unit drive control unit 23, or a method of locking the image blur correction lens group 22 by a mechanical method. In the case of locking it by a mechanical method, since it is not necessary to apply electric current, it is possible to reduce the consuming electricity.

Third Embodiment

Figure 14:
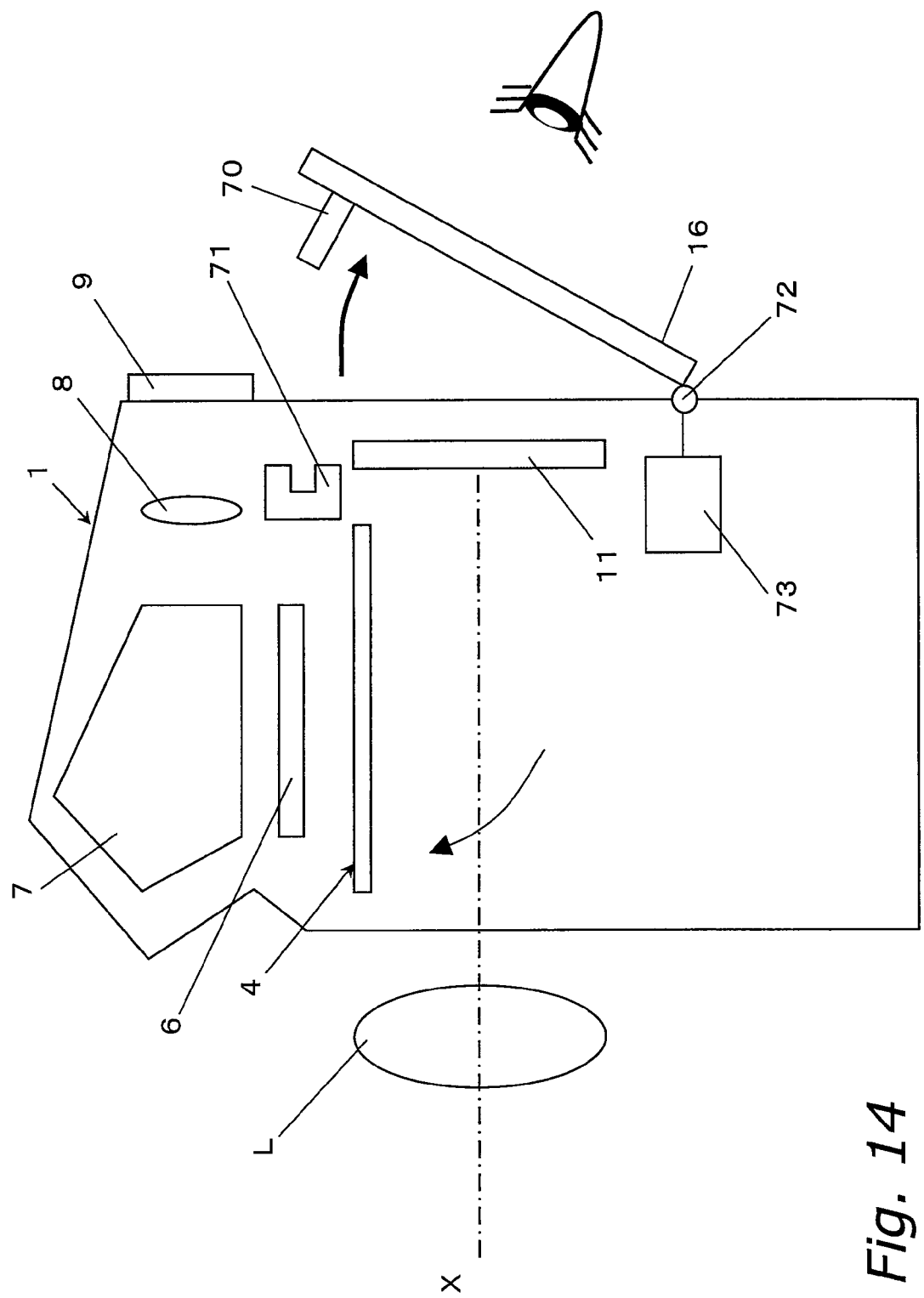
FIG. 14 is a conceptual diagram for explaining the monitor photographing mode according to the third embodiment of the present invention.

In addition, if the liquid crystal monitor 16 is movable, the photographing posture of the user further changes depending on the angle of the liquid crystal monitor 16. For example, when taking a picture with the crowds and the like avoided, as shown in FIG. 14, photographing in a state that the digital camera is raised up to a high position with the angle of the liquid crystal monitor 16 changed (to be tilted and facing downward) by a hinge mechanism 72 is expected. Compared to the case that the liquid crystal monitor 16 is used in the normal position that is orthogonal to the optical axis (for example, the state like in FIG. 6), the posture of the user is more unstable in these particular kinds of state of use and it is anticipated that the most proper shaking frequency will be shifted to further higher.

Figure 12:
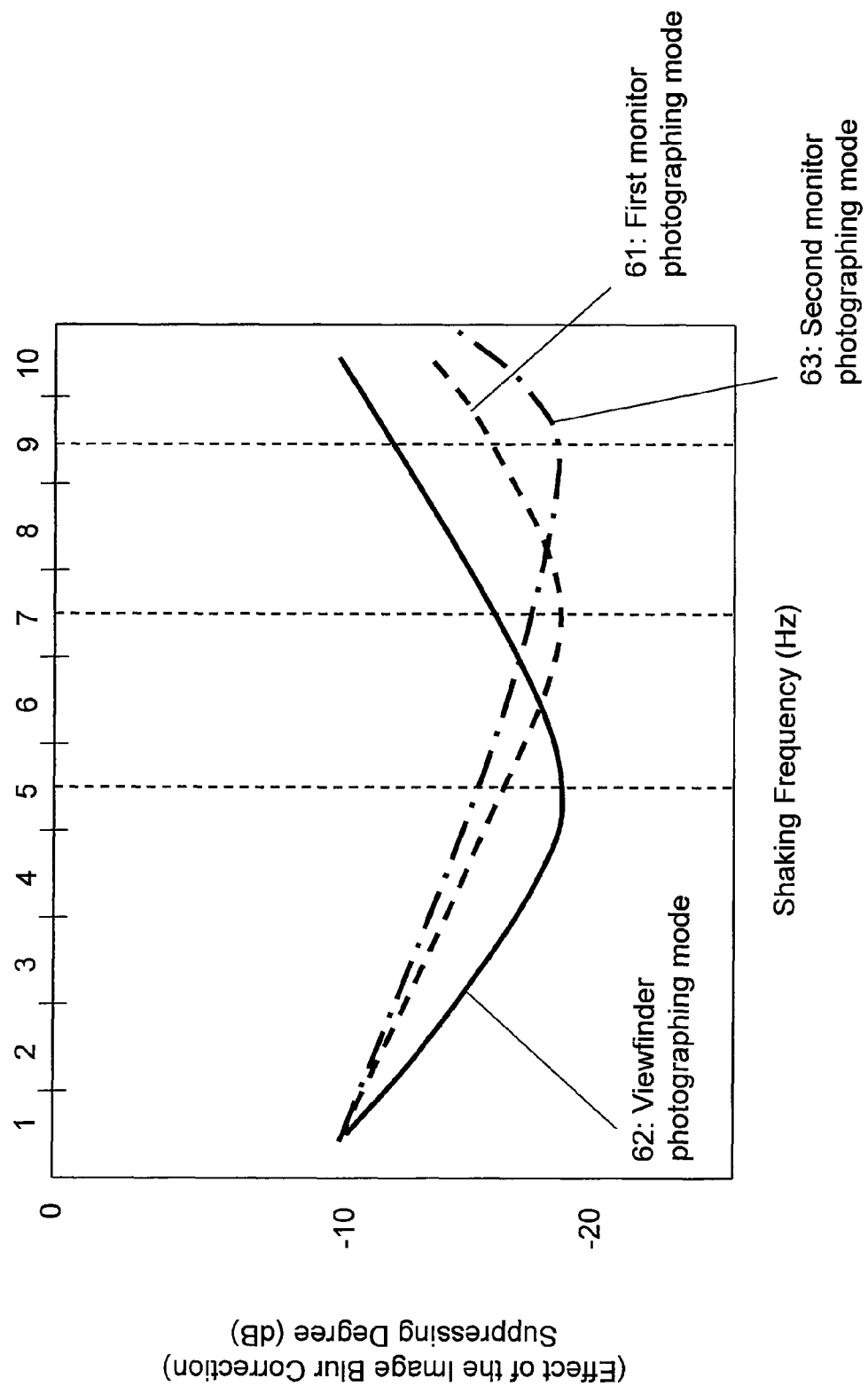
FIG. 12 is a conceptual diagram showing the effect of an image blur correction of a control signal table according to a third embodiment of the present invention.

Consequently, in the camera system according to the present embodiment, in addition to the case of using the viewfinder and the case of using the liquid crystal monitor 16 in the normal position (first monitor photographing mode), a control signal table working for the case of using the liquid crystal monitor 16 with the angle thereof for the optical axis changed (second monitor photographing mode) is added. More specifically, as shown in FIG. 12, control signal table 63 that can make the image blur correction capacity become most excellent around the shaking frequency 9 (Hz) is added. The control signal table 63 corresponding to the second monitor photographing mode is stored in the flash ROM 36, same as the other control signal tables 61 and 62.

Figure 13:
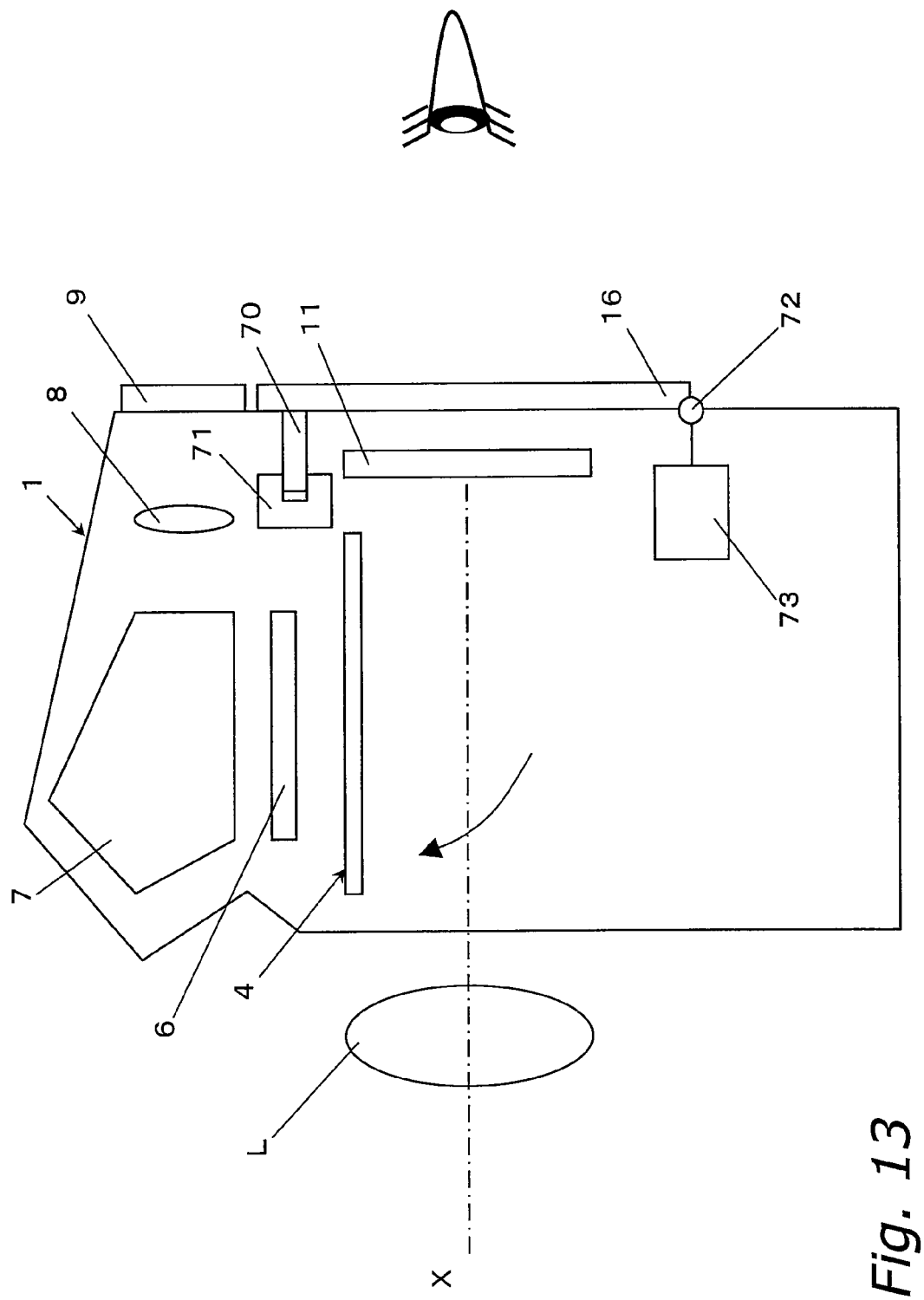
FIG. 13 is a conceptual diagram for explaining the monitor photographing mode according to the third embodiment of the present invention.

In addition, as shown in FIGS. 13 and 14, an opening-closing detection pin 70 that is fixed to the liquid crystal monitor 16 and an opening-closing detection sensor 71 that detects the state of the pin 70 are provided in the camera body 1. As a result, it is possible to detect the opening-closing state of the liquid crystal monitor 16, and it is possible to select a control signal table according to the opening-closing state.

According to the above configuration, it is possible to select a control property that is even more proper for each photographing mode.

Figure 15:
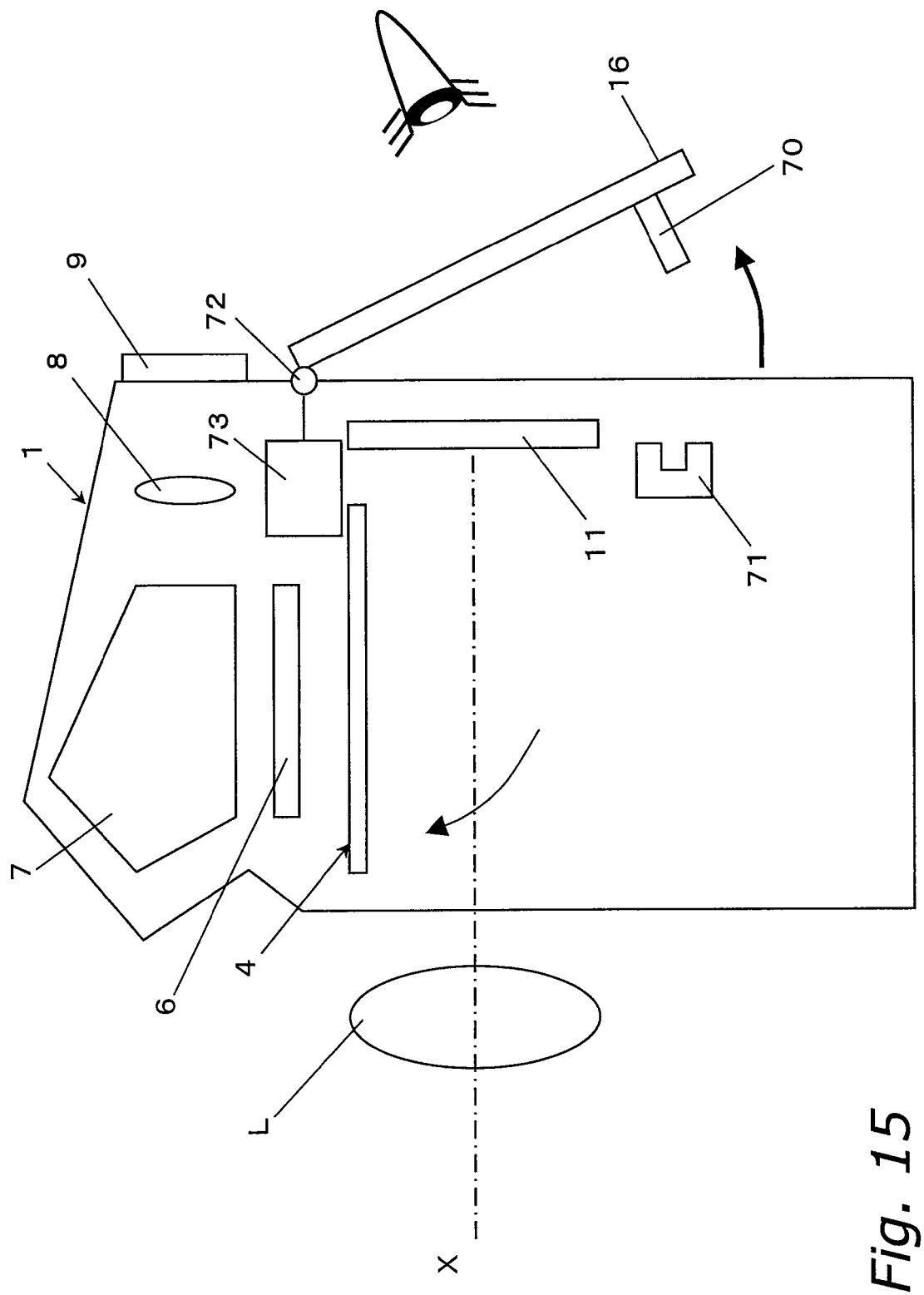
FIG. 15 is a conceptual diagram for explaining the monitor photographing mode according to the third embodiment of the present invention.

In addition, as shown in FIG. 15, the liquid crystal monitor 16 may be configured to open to the upper side or in another direction.

Fourth Embodiment

Figure 16:
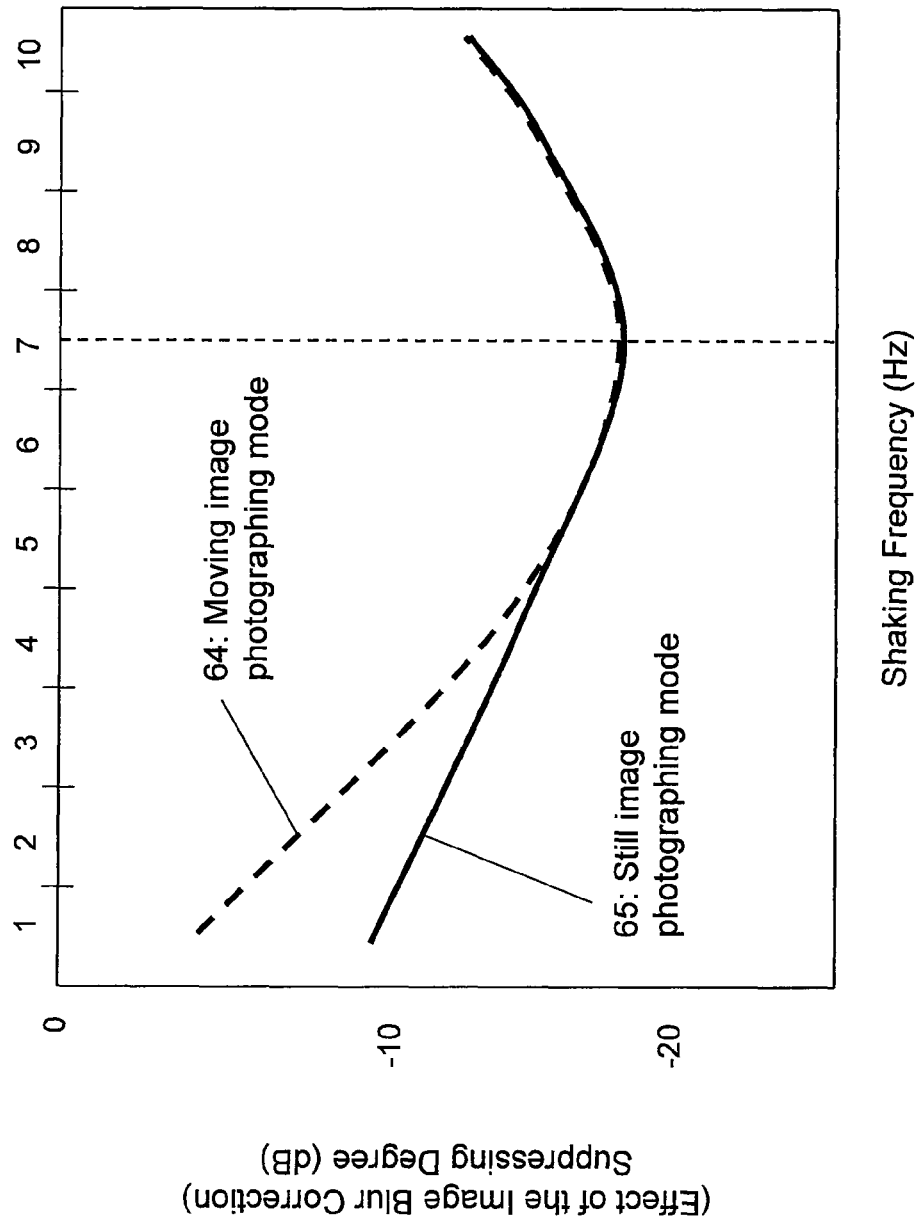
FIG. 16 is a conceptual diagram showing the effect of an image blur correction of a control signal table according to a fourth embodiment of the present invention.

In addition, as shown in FIG. 16, it is also possible to change the control property of the image blur correction depending on when photographing a still image and when photographing a moving image in the monitor photographing mode. More specifically, the shaking suppressing degree in a control signal table 64 corresponding to the moving image photographing mode is set to be low around 1 to 2 (Hz) compared to a control signal table 65 corresponding to the still image photographing mode, in order to reduce the effect due to malfunction at the time of performing panning or tilting. In this way, it is possible to accomplish a more effective image blur correction by optimizing the control property of the image blur correction, depending on when photographing a still image and when photographing a moving image.

Other Embodiments

It is possible to make various changes and corrections in the embodiments of the present invention, without departing from the scope of the invention.

(1)

The first to the fourth embodiments are described each as a separate embodiment. However, it is also possible to implement combinations of the first to the fourth embodiments in various patterns.

(2)

In the above described embodiment, as the image blur correction method, a method of driving the image blur correction lens group is described. However, it is not limited to this method. For example, a method of driving the imaging sensor provided in the digital camera body in the direction orthogonal to the optical axis may be employed. Conventionally, in the method of driving the imaging sensor to perform the image blur correction in a single-lens reflex digital camera, the user can not check the effect of the image blur correction when looking through the viewfinder eyepiece window to take a picture. However, when taking a picture using the liquid crystal monitor, since it is possible to check the effect of the image blur correction, the effect thereof is even more notable. In this case, it is preferable to arrange the operation switch 31 on the side of the camera body 1.

The method of the image blur correction is not limited to the optical method, and it may be an electronic image blur correction.

(3)

The method below may be used for focusing during the monitor photographing mode. In other words, instead of using the focus detection unit 5, it is also possible to perform automatic focus operation using the contrast value of the image data generated at the imaging sensor 11. By using this method, it is not necessary to return the quick return mirror 4 to the fixed position in the optical path X via the quick return mirror drive control unit 29 during the time of focusing. Therefore, it is possible to reduce the time of focusing.

(4)

In the above described third embodiment, two kinds of control properties of the image blur correction unit 47 corresponding to the open state and the close state of the liquid crystal monitor 16 are set. However, the control property may be changed according to the angle of the liquid crystal monitor 16. In this case, as shown in FIGS. 14 and 15, for example, an angle detection unit 73 for detecting the angle of the liquid crystal monitor 16 is provided in the camera body 1. In the flash ROM 36, a plurality of control signal tables or relational expression which can work out a control signal table and the like, depending on the output of the angle detection unit 73, are stored. A control signal table is selected or worked out by the lens microcomputer 20, depending on the output of the angle detection unit 73. In the case of the control properties shown in FIG. 12, the most proper shaking frequency changes between shaking frequencies 7 and 9 (Hz). It is preferable that the larger the most proper shaking frequency becomes, the larger the angle of the liquid crystal monitor 16 becomes. In this case, compared to the above described third embodiment, it is possible to perform even more proper image blur correction according to the usage state.

In addition, the configuration may be that only the liquid crystal monitor 16 is detachable. In this case, the control property of the image blur correction unit 47 is selected depending on whether the liquid crystal monitor 16 is attached or detached.

(5)

In the above described first and second embodiments, the imaging sensor 11 is used for displaying the image on the liquid crystal monitor 16. However, a method may be to arrange some other imaging sensor in the viewfinder optical system to display the image on the liquid crystal monitor 16.

(6)

As described above, when photographing a moving image, the contrast value of the image data generated at the imaging sensor 11 may be used to perform an automatic focus operation. By using this method, it is possible to reduce the time of focusing.

INDUSTRIAL APPLICABILITY

The camera system according to the present invention is useful as a camera system that includes a plurality of photographing modes.

The invention claimed is:

1. A camera system for imaging a subject, comprising:
an imaging optical system for forming an optical image of the subject;
an imaging unit for capturing an image of the optical image;
a display unit which can display the image captured by the imaging unit;
an observing optical system for observing the optical image;
a movable reflecting mirror having a first state in which the light from the imaging optical system is led to the observing optical system, and a second state in which the light from the imaging optical system is led to the imaging unit;
a movement detection unit for detecting an amount of the movement of the camera system;
an image blur correction unit for correcting a blurring of an image which occurs due to the movement of the camera system, depending on the amount of the movement detected by the movement detection unit, the image blur correction unit arranged on a subject side of the reflecting mirror; and
a controller having a first mode in which the movable reflecting mirror is controlled to be in the first state, and a second mode in which the movable reflecting mirror is controlled to be in the second state and the display unit is controlled to display the image; and
a switching operation unit configured to receive a switching operation to change the mode between the first mode and the second mode,
the controller configured to control the mode from the first mode to the second mode and to control the image blur correction unit to start correcting the image blur when the switching operation unit receives the switching operation.

2. The camera system according to claim 1, wherein the controller can control the imaging unit to capture a still image in the second mode.

3. The camera system according to claim 1, wherein the controller can control the imaging unit to capture a moving image in the second mode.

4. A camera system for imaging a subject, comprising:
an imaging optical system for forming an optical image of the subject;
an imaging unit for capturing an image of the optical image;
a display unit which can display the image captured by the imaging unit;
an observing optical system for observing the optical image;
a movable reflecting mirror having a first state in which the light from the imaging optical system is led to the observing optical system, and a second state in which the light from the imaging optical system is led to the imaging unit;
a movement detection unit for detecting an amount of the movement of the camera system;
an image blur correction unit for correcting a blurring of an image which occurs due to the movement of the camera system, depending on the amount of the movement detected by the movement detection unit, the image blur correction unit arranged on a subject side of the reflecting mirror; and
a controller having a first mode in which the movable reflecting mirror is controlled to be in the first state, and a second mode in which the movable reflecting mirror is controlled to be in the second state and the display unit is controlled to display the image; and
a switching operation unit configured to receive a switching operation to change the mode between the first mode and the second mode,
the controller configured to control to change the mode from the second mode to the first mode and to control the image blur correction unit to stop correcting the image blur, when the switching operation unit receives the switching operation when the image blur correction unit operates in the second mode.

5. The camera system according to claim 4, wherein the controller can control the imaging unit to capture a still image in the second mode.

6. The camera system according to claim 4, wherein the controller can control the image unit to capture a moving image in the second mode.

* * * * *